United States Patent
Niwa

(10) Patent No.: US 7,065,963 B2
(45) Date of Patent: Jun. 27, 2006

(54) VIBRATION AND HEAT INSULATING BOARD

(75) Inventor: Takahiro Niwa, Tokyo (JP)

(73) Assignee: Nichias Corporation, Tokyo (JP)

( * ) Notice: Subject to any disclaimer, the term of this patent is extended or adjusted under 35 U.S.C. 154(b) by 60 days.

(21) Appl. No.: 10/882,230

(22) Filed: Jul. 2, 2004

(65) Prior Publication Data

US 2005/0028963 A1    Feb. 10, 2005

(30) Foreign Application Priority Data

Jul. 11, 2003 (JP) .............................. 2003-273668

(51) Int. Cl.
*F01N 7/10* (2006.01)
(52) U.S. Cl. ............................ 60/323; 60/272; 60/320; 60/324; 165/72; 165/73; 411/262; 411/339; 411/341; 411/552
(58) Field of Classification Search .................. 60/272, 60/320, 322, 323, 324; 165/72, 73, 74, 75, 165/DIG. 349; 411/262, 338, 339, 341, 342, 411/343, 347, 552
See application file for complete search history.

(56) References Cited

U.S. PATENT DOCUMENTS

| | | | | |
|---|---|---|---|---|
| 4,612,767 A | * | 9/1986 | Engquist et al. | ............... 60/321 |
| 5,211,013 A | * | 5/1993 | Bonde et al. | ................. 60/323 |
| 5,347,810 A | * | 9/1994 | Moore, III | .................... 60/323 |
| 5,844,177 A | * | 12/1998 | Pirchl | .......................... 181/211 |
| 6,302,466 B1 | * | 10/2001 | Zwick | ....................... 296/39.3 |
| 6,318,734 B1 | * | 11/2001 | Boskamp | ..................... 277/598 |
| 6,328,513 B1 | * | 12/2001 | Niwa et al. | .................. 411/339 |
| 6,397,765 B1 | * | 6/2002 | Becker | ....................... 110/336 |
| 6,438,949 B1 | * | 8/2002 | Nozaki | ......................... 60/322 |
| 6,541,855 B1 | * | 4/2003 | Uzuka | ......................... 257/712 |

FOREIGN PATENT DOCUMENTS

| JP | 56-17313 | 2/1981 |
|---|---|---|
| JP | 4-71733 | 6/1992 |

* cited by examiner

*Primary Examiner*—Binh Q. Tran
(74) *Attorney, Agent, or Firm*—Oblon, Spivak, McClelland, Maier & Neustadt, P.C.

(57) ABSTRACT

A vibration and heat insulating board fixed so as to cover at least part of a heat source while forming a gap against the heat source surface, in order to lessen diffusion of heat from the heat source fixed in a vibration source, in which the heat source and the vibration and heat insulating board are coupled by means of a collar member having a pair of locking pieces fitted to the vibration and heat insulating board main body and bolted to a mounting part of the heat source, and ring-shaped coil members interposed between the pair of locking pieces of the collar member and the vibration and heat insulating board main body.

4 Claims, 3 Drawing Sheets

VIBRATION AND HEAT INSULATING BOARD

BACKGROUND OF THE INVENTION

1. Field of the Invention

The present invention relates to a vibration and heat insulating board disposed, for example, around an exhaust manifold of an automotive engine.

2. Description of Background Art

As shown in FIG. 4, in an exhaust manifold 101 of an automotive engine, combustion emission of high temperature reaching several hundred degrees flows inside along with operation of the engine 100. To prevent heat and vibration generated in the exhaust manifold 101 from diffusing into the engine room or outside parts of the vehicle, a vibration and heat insulating board 102 is disposed around the exhaust manifold 101. If the vibration and heat insulating board 102 is directly coupled to the exhaust manifold 101 by means of bolts 103, heat and vibration of the exhaust manifold 101 are directly transmitted to the vibration and heat insulating board 102, and the effect of installation of the vibration and heat insulating board 102 is reduced. Accordingly, the exhaust manifold 101 and vibration and heat insulating board 102 are usually coupled by way of a buffer member not shown in the drawing.

Japanese Laid-open Utility Model No. S56-17313 discloses a heat insulating board which is prepared by disposing a wire mesh member in a mounting part on a vibration source, and coupling this wire mesh member integrally to a heat resistant metal plate. Japanese Laid-open Utility Model No. H4-71733 discloses a heat insulating board composed of inside and outside metal plates, and a heat resisting mesh interposed on substantially entire surface between these metal plates, in which the metal plates are notched around the mounting part of the heat insulating board to expose the mesh, and the exposed mesh is attached to a fixing member. In these heat insulating boards, vibration of the vibration source can be controlled, but it is not enough to shield the heat diffusion from the exhaust manifold, and mounting on the vibration source is unstable. To solve these problems, two rigid members are prepared having flange members (locking pieces) projecting from one end of cylindrical members (sleeves) horizontally to outside, the other ends of the cylindrical members being joined to form a collar member, and a wire mesh member having a hole larger than the outside diameter of the cylindrical members but smaller than the outside diameter of the flange members is freely fitted in the cylindrical members to compose a heat insulating board. According to this heat insulating board, the collar member is firmly tightened by bolts to the specified fixing position of the vibration source, the collar member and wire mesh member are coupled in freely fitting state, and therefore the contact parts thereof are only partial and variable, so that the heat insulating effect is high.

SUMMARY OF THE INVENTION

In the heat insulating board having such high heat insulating effect, however, the collar member and wire mesh member collide against each other due to transverse vibration of the exhaust manifold, an unusual sound is generated and the wire mesh member is damaged. Besides, the buffer member used in this heat insulating board is composed of a pair of collar members, a wire mesh member, and a member attached to the outer periphery of the wire mesh member, and it requires three components including the fitting member to be fitted to the heat insulating board main body, and the cost is increased.

It is hence a primary object of the present invention to provide a vibration and heat insulating board extremely reduced in the number of components for composing the buffer member, and with a high in the heat insulating effect and a vibration preventing effect.

To solve the problems of the prior arts, the present invention presents a vibration and heat insulating board fixed so as to cover at least part of a heat source while forming a gap against the heat source surface, in order to lessen the diffusion of heat from the heat source fixed in a vibration source, in which the heat source and the vibration and heat insulating board are coupled by means of a collar member having a pair of locking pieces fitted to the vibration and heat insulating board main body and bolted to the heat source, and a spring member interposed between the pair of locking pieces of the collar member and the vibration and heat insulating board main body.

According to the vibration and heat insulating board of the present invention, the buffer member is substantially composed of two components, that is, the pair of collar members and the spring member, and the structure is simple, so that the cost can be lowered. Besides, the vibration from the vibration source is absorbed by the spring member, and the vibration control effect is high. Further, diffusion of heat from the heat source is isolated by the spring member, and the heat insulating effect is high.

BRIEF DESCRIPTION OF THE DRAWINGS

A more complete appreciation of the present invention, and many of the attendant advantages thereof, will be more readily obtained as the same becomes better understood by reference to the following figures in which.

DETAILED DESCRIPTION OF THE PREFERRED EMBODIMENT

Figure 1:
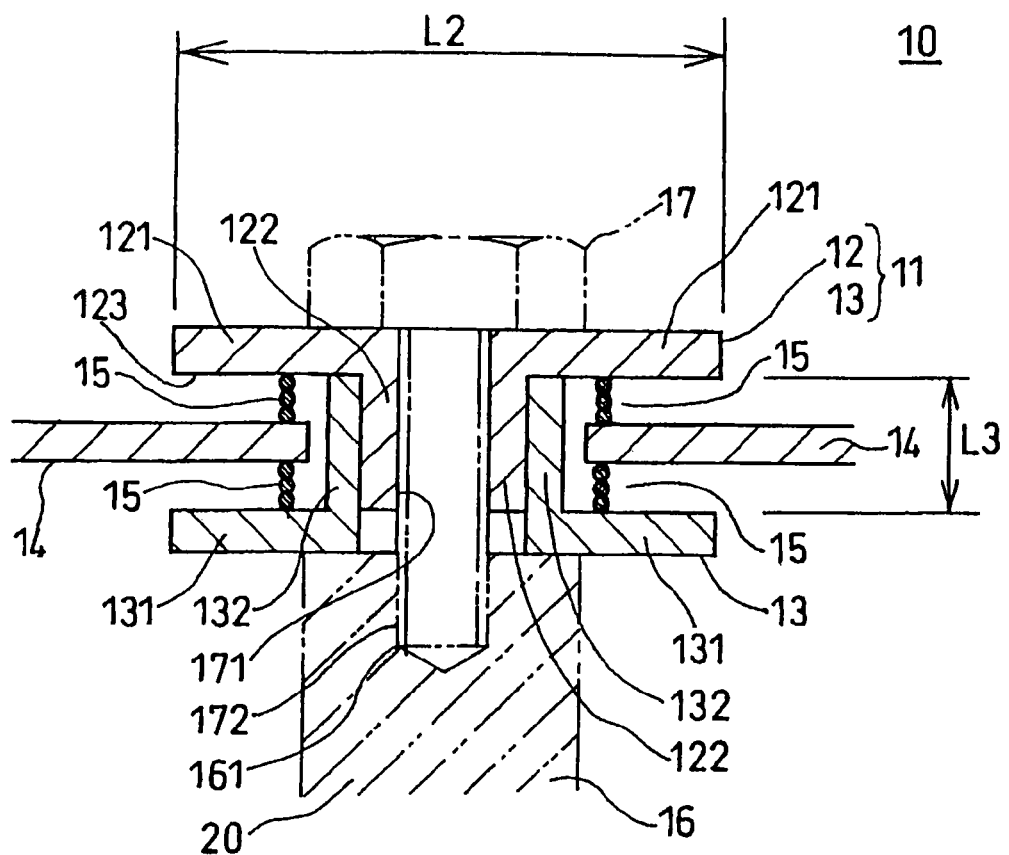
FIG. 1 is an enlarged longitudinal sectional view of buffer member portion of vibration and heat insulating board in a preferred embodiment of the present invention.

A vibration and heat insulating board in a preferred embodiment of the present invention is described below while referring to FIG. 1 to FIG. 3. In the present invention, the vibration source is, for example, an automobile or an exhaust manifold provided in the automobile. The heat source is, for example, an exhaust manifold of an automobile. A vibration and heat insulating board 10 of the preferred embodiment is fixed so as to cover at least part of an exhaust manifold 20 while forming a gap against the surface of the exhaust manifold 20 in order to lessen the diffusion of heat from the exhaust manifold 20 of an automotive engine.

In the vibration and heat insulating board 10, the exhaust manifold 20 and vibration and heat insulating board 10 are coupled by means of a collar member 11 having a pair of upper and lower locking pieces 121, 131 fitted in a vibration and heat insulating board main body 14 and bolted to the exhaust manifold 20, and spring members 15, 15 interposed between the pair of upper and lower locking pieces 121, 131 of the collar member 11 and the vibration and heat insulating board main body 14.

In the present invention, the collar member having a pair of locking pieces is composed as follows: an outside collar member formed of a cylindrical member and a flange-shaped locking piece formed at one end of the cylindrical member, and an inside collar member formed of a cylindrical member and a flange-shaped locking piece formed at one end of the cylindrical member are mutually inserted or fitted so that the other ends of the cylindrical members may be opposite to each other. To insert or fit mutually so that the other ends of the cylindrical members may be opposite to each other, for example, the cylindrical member of the outside collar member is fitted into the hole of the cylindrical member of the inside collar member, the cylindrical member of the inside collar member is fitted into the hole of the cylindrical member of the outside collar member, or the other ends of the cylindrical members of the outside collar member and inside collar member are mutually abutted and fitted tightly. The inside collar member is a partial collar member of which locking pieces are positioned at the heat source side of the vibration and heat insulating board main body, and the outside collar member is a partial collar member of which locking pieces are positioned at the opposite side of the heat source side of the vibration and heat insulating board main body. The mode of inserting the cylindrical member of the outside collar member into the hole of the cylindrical member of the inside collar member is explained below.

Figure 2:
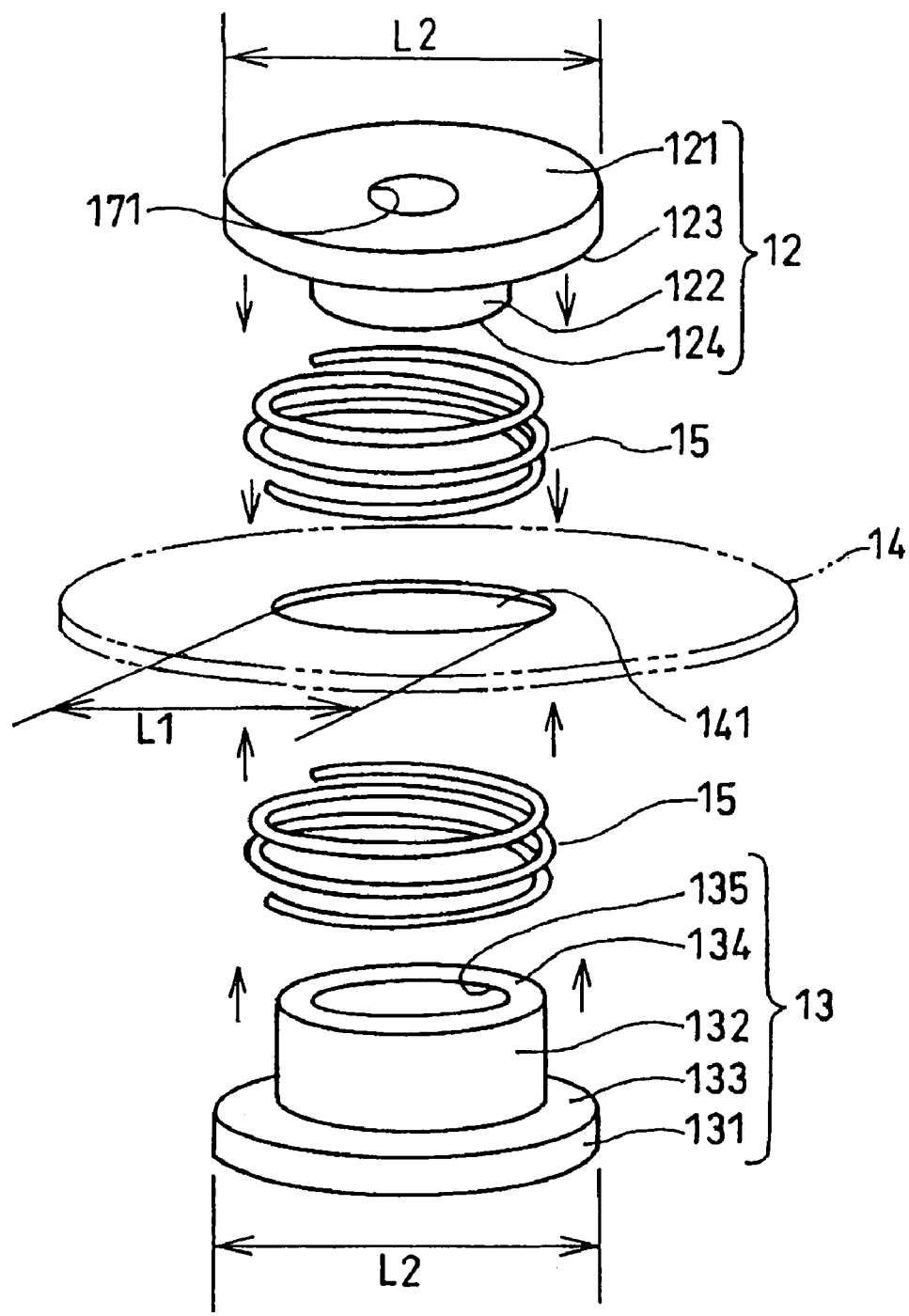
FIG. 2 is a diagram explaining a method of mounting of collar member on the vibration and heat insulating board main body.
Figure 3:
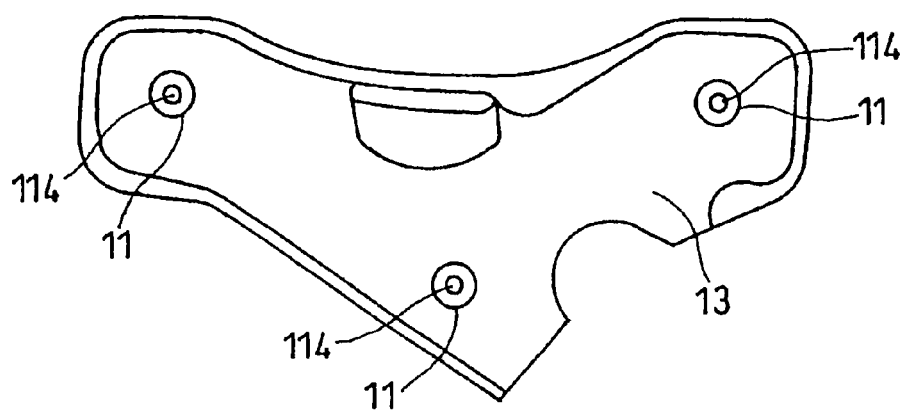
FIG. 3 is front view of vibration and heat insulating board of the preferred embodiment.
Figure 4:
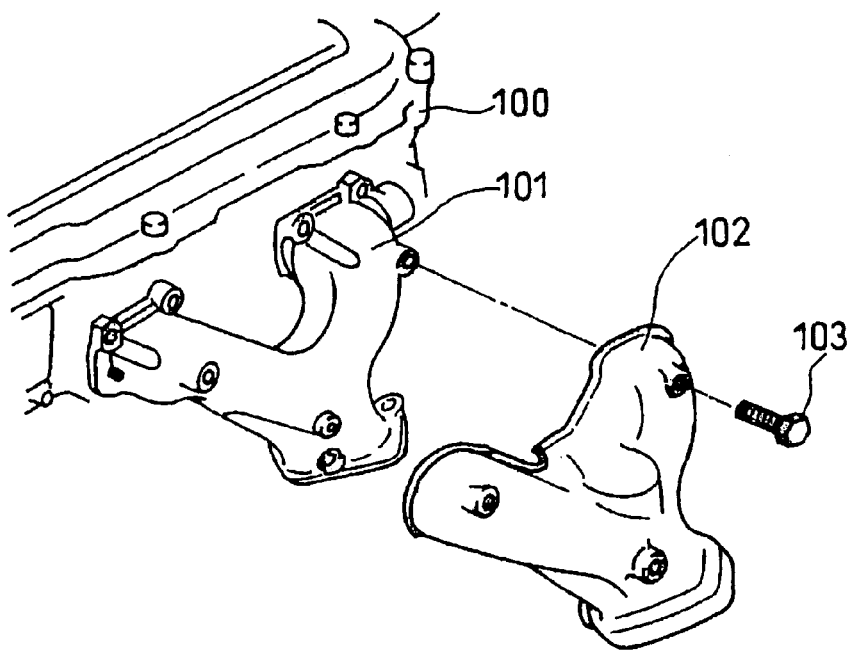
FIG. 4 is a diagram explaining a method of installation of vibration and heat insulating board and exhaust manifold in a prior art.

In FIG. 1 and FIG. 2, an outside collar member 12 includes a cylindrical member 122 having a bolt hole 171 for inserting a bolt 17, and a flange-shaped locking piece 121 projecting horizontally to outside from the upper end of the cylindrical member 122. The bolt hole 171 is slightly larger than the outside diameter of the bolt 17, so that the bolt 17 can be inserted without resistance. A rear side 123 of the locking piece 121 of the outside collar member 12 is a flat part for abutting against the end member of the spring member 15, or its abutting part is a concave form (not shown). The length of the cylindrical part 122 of the outside collar member 12 is defined so as not to project from an inside collar member 13 when the outside collar member 12 and inside collar member 13 are assembled. If the length of the cylindrical member 122 of the outside collar member 12 is too short, it is hard to assemble, and stability is not sufficient after assembling. Therefore, the length of the cylindrical member 122 should be preferably in a range from half of gap L3 formed by the pair of locking pieces 121, 131 to less than L3.

The inside collar member 13 includes a cylindrical member 132 having an insertion hole 135 for inserting the cylindrical member 122 of the outside collar member 12, and a flange-shaped locking piece 131 projecting horizontally to outside from the lower end of the cylindrical member 132. The inside diameter of the insertion hole 135 is slightly larger than the outside diameter of the cylindrical member 122 of the outside collar member 12, so that it is easy to insert without looseness. The upper side 133 of the locking piece 131 of the inside collar member 13 is a flat part for abutting against the end member of the spring member 15, or its abutting part is a concave form (not shown). The upper end of the cylindrical member 132 is preferably flat in order to abut against the rear side 123 of the locking piece 121 of the outside collar member 12. The length of the cylindrical member 132 of the inside collar member 13 is defined to so as to form a gap L3 by the pair of locking pieces 121, 131 when the outside collar member 12 and inside collar member 13 are assembled.

In the collar member 11, the diameter L2 of both locking pieces 121, 131 defined so that a gap may be formed around the cylindrical member 132 of the inside collar member 13, and that the spring member 15 may be inserted in the gap between the locking piece 121 and vibration and heat insulating board main body 14. The gap L3 between both locking pieces 121, 131 is large enough for inserting a ring-shaped spring member 15 between upper and lower surfaces of the vibration and heat insulating board main body 14 and vibration and heat insulating board main body 14.

The shape and processing method of the vibration and heat insulating board main body 14 may conform to the known method. The vibration and heat insulating board main body 14 has a hole 141 of diameter L1 for mounting the collar member 11. This hole 141 is formed at a position opposite to the mounting part 16 of exhaust manifold when mounting the vibration and heat insulating board 10 on the exhaust manifold. The diameter L1 is large enough to form a gap of 0.5 to 2.0 mm around the cylindrical member 132, in relation to the diameter of the cylindrical member 132 of the inside collar member 13. Therefore, heat is not transmitted directly from the heat source 20 to the vibration and heat insulating board main body 14. Female threads 172 to be engaged with the bolt 17 are formed in the mounting part 16 of the exhaust manifold.

The spring member 15 is disposed to force the upper and lower members with the spring force, in the specified upper and lower gaps formed between the both locking pieces 121, 131 and the vibration and heat insulating board main body 14, and it is a ring-shaped coil spring in this preferred embodiment. Thus, the vibration and heat insulating board main body 14 is supported on the collar member 11 by way of two ring-shaped coil springs, and the vibration from the exhaust manifold can be absorbed by the ring-shaped coil spring, and heat diffusion can be also isolated, so that both vibration control effect and heat insulation effect can be enhanced. As far as having such effect, the spring member 15 is not limited to the ring-shaped coil spring, but may be realized by a ring-shaped rigid elastic element.

Referring now to FIG. 2, the following is to explain a method of mounting the buffer member composed of collar member 11 and spring member 15 on the vibration and heat insulating board main body 14. The vibration and heat insulating board main body 14 has the hole 141 of diameter L1 formed at specified position. First, the cylindrical member 132 of the inside collar member 13 is passed through the ring-shaped coil spring 15, and the ring-shaped coil spring 15 is disposed on the upper side 133 of the locking piece 131 of the inside collar member 13. In the hole 141 of the vibration and heat insulating board main body 14, the inside collar member 13 mounting the ring-shaped coil spring 15 is fitted from the rear side. That is, the upper side 133 of the locking piece 131 of the inside collar member 13 abuts against the rear side of the vibration and heat insulating board main body 14. Another ring-shaped coil spring 15 is disposed on the vibration and heat insulating board main body 14 so that the hole 141 of the vibration and heat insulating board main body 14 may be located inside thereof. The cylindrical member 122 of the outside collar member 12 is passed through the two ring-shaped coil springs 15 and the hole 141 of the vibration and heat insulating board main body 14, and passed into the insertion hole 135 of the cylindrical member 132 of the inside collar member 13. As a result, the vibration and heat insulating board 10 as shown in FIG. 1 is manufactured.

The vibration and heat insulating board main body 14 is supported on the collar member 11 by the spring thrusting force of the upper and lower ring-shaped coil springs 15, 15. The collar member 11 is a rigid member, and is not deformed by bolting. Therefore, the ring-shaped coil springs 15 disposed in the gap formed between the pair of upper and lower locking pieces 121, 131 and the vibration and heat insulating board main body 14 are not fixed by fusing, but will not come off.

The vibration and heat insulating board 10 composed in this manner is fitted, for example, so as to cover the entire surface of the exhaust manifold, and tightened by bolts 17 by finely adjusting the relative positions of the bolt holes 171 in the collar member 11 and the mounting part 16 of the exhaust manifold 20.

According to the vibration and heat insulating board 10 of the preferred embodiment, the buffer member is substantially composed of two kinds of components, that is, the collar member 11 and spring member 15, and the structure is simple, and hence the cost is reduced. Vibration from the vibration source is absorbed by the spring member, and therefore, the vibration control effect is high. In particular, in spite of transverse vibration, the vibration and heat insulating board main body 14 will not contact with the collar member 11, and unusual sound or damage will not be caused. Further, heat diffusion from the heat source is isolated by the spring member, and the heat insulating effect is also high.

What is claimed is:

1. A vibration and heat insulation apparatus, which comprises:
    a vibration and heat insulating board fixed so as to cover at least part of a heat source while forming a gap against the heat source surface, in order to lessen diffusion of heat from the heat source fixed in a vibration source, wherein a main body of the heat source and the vibration and heat insulating board are coupled by means of a collar member having a pair of locking pieces fitted to the vibration and heat insulating board main body and bolted to the heat source, and a spring member interposed between the pair of locking pieces of the collar member and on opposite sides of the vibration and heat insulating board main body wherein the spring member comprises a spring positioned on opposite sides of said vibration and heat insulating board and said locking pieces comprise inner and outer collar members interfitted together.

2. The vibration and heat insulating apparatus according to claim 1, wherein said locking pieces comprise first and second locking pieces each of which comprises an outside collar member formed of a cylindrical member and a flange-shaped locking piece formed at a first end of the cylindrical member, and an inside collar member formed of a cylindrical member and a flange-shaped locking piece formed at a second end of the cylindrical member opposite said first end, said cylinder members of said first and second locking pieces being interfitted with one another so that the cylindrical members are spaced opposite each other and said first ends of said cylindrical member of the first locking piece engages the flange-shaped locking piece of the second locking piece.

3. The vibration and heat insulating apparatus according to claim 1, wherein the heat source comprises an exhaust manifold of an automotive engine.

4. The vibration and heat insulating apparatus according to claim 1, wherein said spring member comprises a coil spring.

* * * * *